United States Patent [19]

Idesawa

[11] Patent Number: 4,637,715
[45] Date of Patent: Jan. 20, 1987

[54] OPTICAL DISTANCE MEASURING APPARATUS

[75] Inventor: Masanori Idesawa, Saitama, Japan

[73] Assignee: Rikagaku Kenkyusho, Japan

[21] Appl. No.: 642,139

[22] Filed: Aug. 17, 1984

[30] Foreign Application Priority Data

Sep. 1, 1983 [JP] Japan .................................. 58-161088

[51] Int. Cl.$^4$ ............................. G01C 3/00; G03B 3/00
[52] U.S. Cl. ............................................. 356/1; 356/2; 354/402
[58] Field of Search ........................... 350/1, 3, 4, 7-9, 350/12, 13, 15, 2; 354/400, 402, 403, 406, 407, 408, 77, 117, 162, 163

[56] References Cited

U.S. PATENT DOCUMENTS

| | | | |
|---|---|---|---|
| 1,531,693 | 3/1925 | Douglas | 354/117 |
| 3,614,921 | 10/1971 | Yamanaka et al. | 354/402 |
| 3,749,493 | 7/1973 | Malovski | 356/2 |
| 3,844,658 | 10/1974 | Gela et al. | 354/163 |
| 4,146,926 | 3/1979 | Clerget et al. | |

OTHER PUBLICATIONS

Kanade et al., "An Optical Proximity Sensor for Measuring Surface Position and Orientation for Robot Manipulation", CMU-RI-TR83-15; Robotics Institute; Carnegie-Mellon University, Pittsburgh, PA.

A. R. Johnson, "Optical Proximity Sensors for Manipulators"; technical memorandum 33-612, Jet Propulsion Lab., 1973.

Tokuji Okada, "Development of an Optical Distance Sensor for Robots", Robotics Research, vol. 1, No. 4, pp. 3-14, 1982.

*Primary Examiner*—Russell L. Adams
*Attorney, Agent, or Firm*—Brumbaugh, Graves, Donohue & Raymond

[57] ABSTRACT

Disclosed in an optical distance measuring apparatus using an observation lens and at least one reflector. Thanks to the use of reflectors the whole size of the apparatus reduced at least one half of a conventional distance measuring apparatus, still assuring the same exactness as the conventional apparatus in measuring a distance.

16 Claims, 7 Drawing Figures

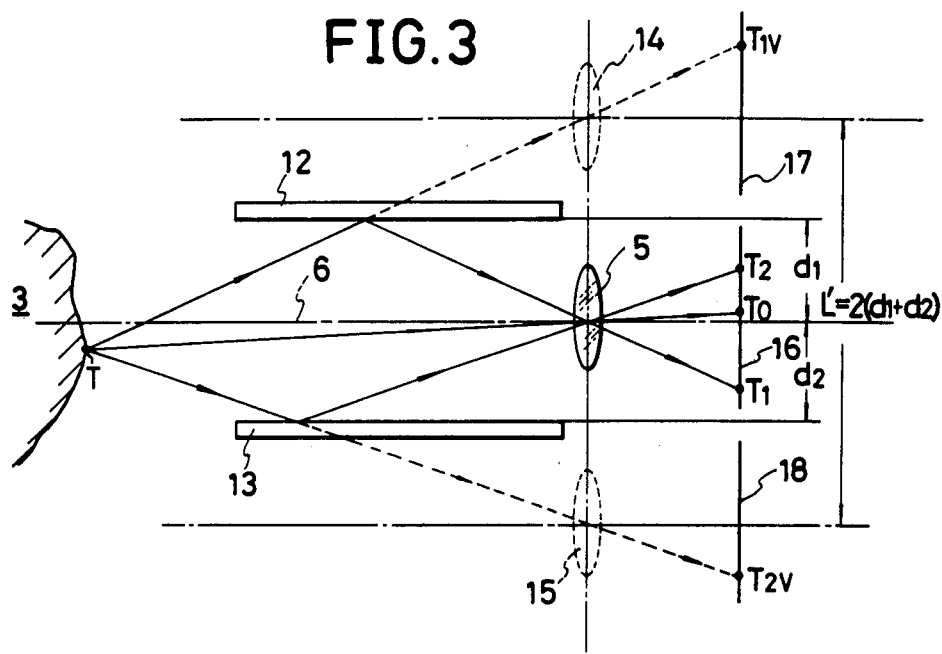
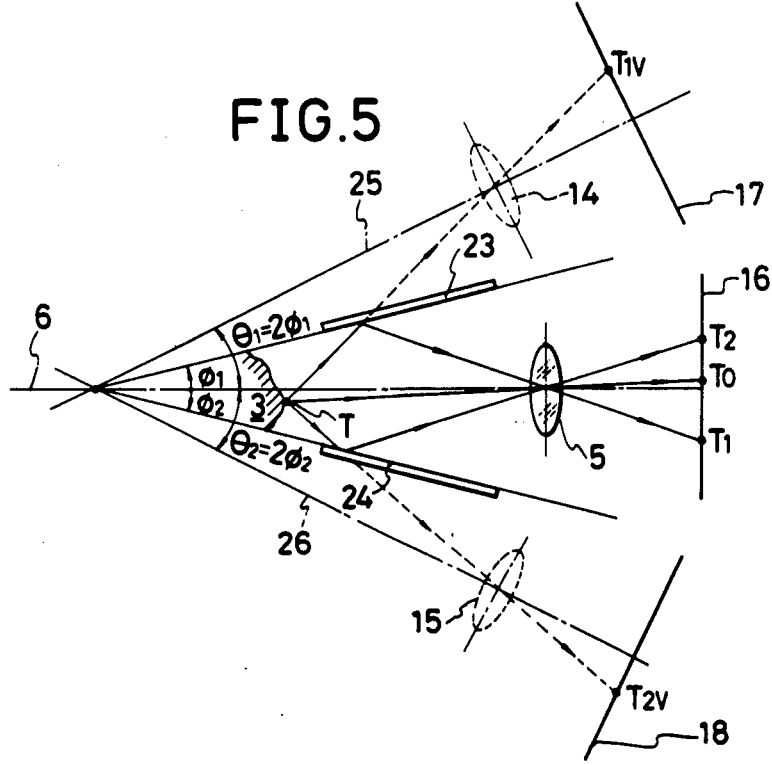

OPTICAL DISTANCE MEASURING APPARATUS

BACKGROUND OF THE INVENTION

This invention relates to an optical distance measuring apparatus using the principle of triangulation.

A three-dimensional distance measurement is required in determing a three-dimensional shape or deformation, and such distance measurement has been widely conducted according to the principles of triangulation. As is well known, in the triangulation any one of the three sides constituting a triangle and the angles at both ends of the one side of the triangle are determined so that the triangle can be determined, and then the apex opposite to the one side in the so determined triangle is determined. FIG. 1 shows one example of measuring a distance from the nodal point of an observation lens to a given point on an object according to the principle of triangulation. As shown, two optical observation systems represented by observation lenses 1 and 2 are arranged a given distance "L" apart from each other with their optical axes parallel to each other. Then, the distance "Z" from the nodal point of the observation lenses 1 and 2 to a target "T" on an object 3 to be measured is given by:

$$Z = A \cdot L / (Xa + Xb),$$

where "A" stands for a distance from the observation lenses 1 and 2 to an observation plane and "Xa" and "Xb" stand for distances from the optical axes of the observation systems 1 and 2 to those points on which the images of the target "T" appear on the observation plane.

A good accuracy with which a distance is determined according to the triangulation cannot be obtained without elongating the distance "L" between the two optical observation systems. As a result the whole apparatus is inevitably large in size. Therefore, the triangulation cannot be applied to such as an endoscope, which must be, in its nature, small in size.

OBJECTS AND THE SUMMARY OF THE INVENTION

The object of this invention is to provide a distance measuring apparatus which is relatively small in size in spite of adopting the principle of triangulation in measuring a distance.

To attain this object a distance measuring apparatus according to this invention comprises an observation lens and at least one reflector, the observation lens being positioned so that a ray of light from any point on an object falls directly on the observation lens, and so that a ray of light from the point falls on the observation lens after being reflected by the reflector, thereby determining a distance from the nodal point of the observation lens to the point on the object according to the triangulation using the imaging points on which the direct and reflected ray of light focus.

BRIEF DESCRIPTION OF THE DRAWINGS

FIGS. 2 to 5 show diagrammatically different distance measuring apparatuses according to this invention;

DESCRIPTION OF THE PREFERRED EMBODIMENTS

Figure 2:
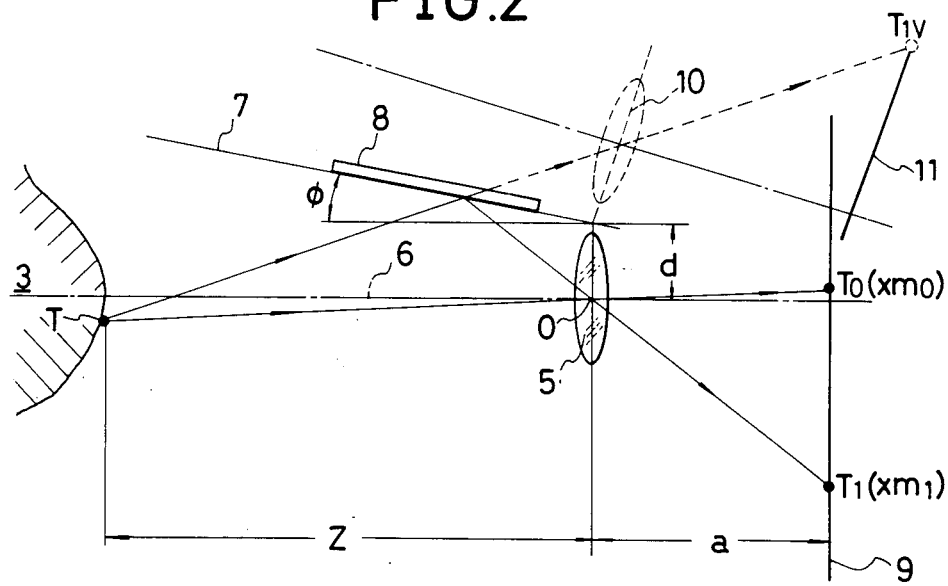

FIG. 2 shows diagrammatically a distance measuring apparatus according to this invention as comprising an observation lens 5 and a reflector 8 which is inclined at an angle $\phi$ with respect to a line laid a distance "d" apart from the optical axis of the observation lens 5 and extending parallel thereto. A ray of light from a given point T on an object 3 after being reflected by the reflector 8 will focus on a point $T_1$ in an observation plane 9, and a ray of light from the given point T will focus on a point $T_0$ in the observation plane.

An imaginary lens 10 which is supposed to appear at a position symmetrical to the observation lens 5 with respect to the reflector 8, would form an imaginary image $T_{1V}$ on an imaginary observation plane 11, and the imaginary image $T_{1V}$ would be symmetrical with the image $T_1$ on the observation plane 9 with respect to the inclined line 7. Thus, the incidence angle at which the imaginary ray of light would fall on the imaginary lens 10 is equal to the incidence angle at which the ray of reflected light falls on the observation lens 5. The image $T_{1V}$ would be formed by the imaginary lens 10 positioned in the mirror image relationship with the observation lens 5 with respect to the inclined line 7. The sign of the coordinate of the image $T_1$ is opposite to that of the coordinate of the image $T_{1V}$.

Figure 1:
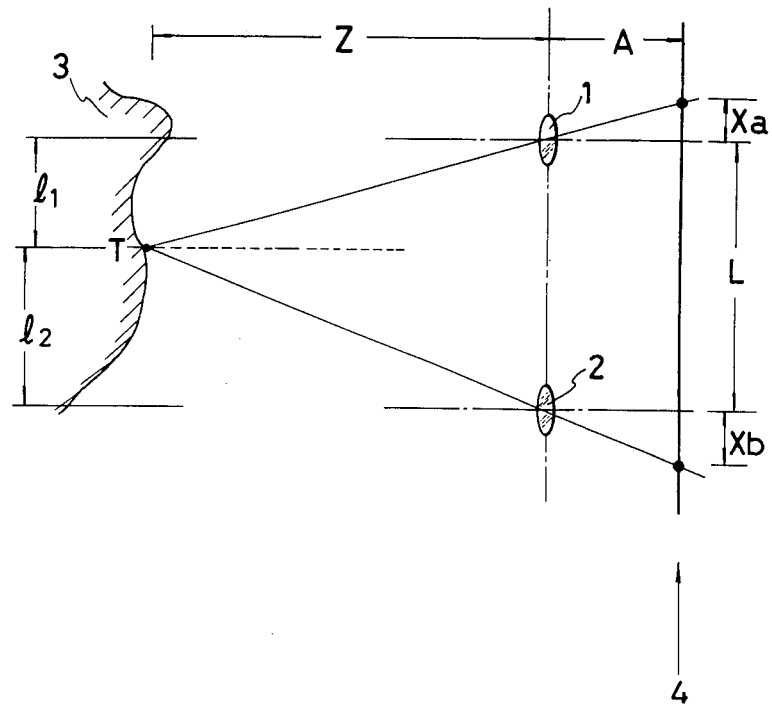
FIG. 1 shows diagrammatically a conventional distance measuring method.

The arrangement including the reflector 8 and the actual and imaginary lenses 5 and 10 is equivalent to a triangulation arrangement using two actual lenses at the same positions as the actual and imaginary lenses 5 and 10 (the arrangement in FIG. 1 corresponding to that in FIG. 2 for $\phi = 0$ and $d = L/2$).

Thus, the arrangement of the reflector 8 and the observation lens 5 according to the invention (FIG. 2) is effective to provide the same advantage as a triangulation distance measuring apparatus using two lenses a good distance apart from each other, requiring only as half a space or size as a conventional triangulation distance measuring apparatus of FIG. 1. With the triangulation arrangement as shown in FIG. 2 the distance "Z" and "X" coordinate of the given point T are given by the following equations:

$$Z = \frac{a\, d(x_{m1} \cdot \sin 2\phi - 2a\cos 2\phi)}{a(a\sin 2\phi + x_{m1} \cdot \cos 2\phi) - x_{m0} \cdot (a\cos 2\phi - x_{m1} \cdot \sin 2\phi)} \quad (2)$$

$$X = \frac{x_{m0} \cdot Z}{a}$$

where "$X_m0$" and "$X_m1$" stand for the coordinates of the imaging points $T_0$ and $T_1$.

FIG. 3 shows another embodiment of this invention using two plane mirrors 12 and 13 positioned "$d_1$" and "$d_2$" apart from the optical axis of the observation lens 5 and laid parallel thereto. With this arrangement a distance to a given point "T" on an object 3 can be determined from the positions of the images $T_1$ and $T_2$ on which the rays of light from the given point "T" focus after reflecting from the plane mirrors 12 and 13. The arrangement of FIG. 3, in fact, is equivalent to a conventional triangulation distance measuring apparatus with its base line twice as long as "$d_1$" plus "$d_2$", thus permitting the determination of the distance to the given point according to equation 1.

The reflectors 12 and 13 would provide imaginary observation lenses 14 and 15. The ray of light from the given point T on the object 3 will focus directly on the point $T_0$ on the observation plane 16, and at the same time the rays of light from the given point T on the object 3 will focus on the point $T_1$ and $T_2$ after being reflected by the reflectors 12 and 13. The imaginary lenses 14 and 15 would focus the imaginary images $T_{1V}$ and $T_{2V}$ on the imaginary observation planes 17 and 18. The construction permits the reduction of the width of the whole apparatus to about one third of the conventional triangulation distance measuring apparatus of FIG. 1 using the lenses at the same positions as the imaginary lenses 14 and 15.

Figure 4:
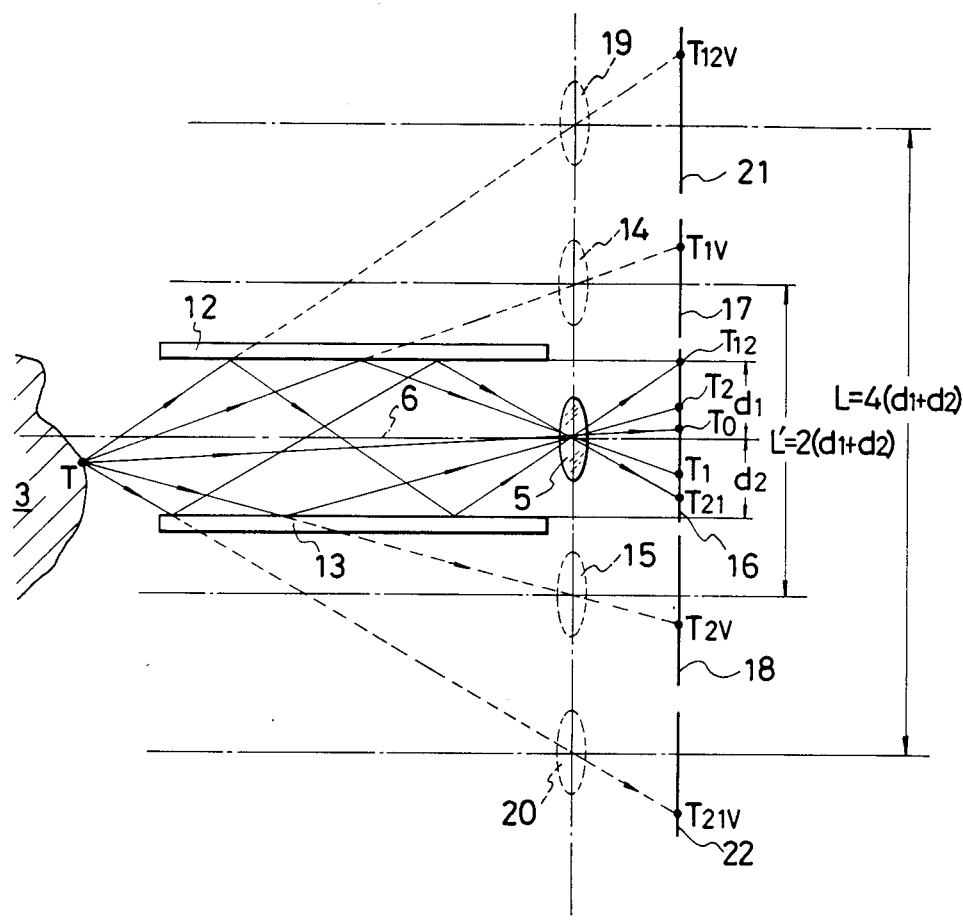

FIG. 4 shows an arrangement similar to that of FIG. 3, but using two reflectors 12 and 13 long enough to permit the rays of light from a given point T on an object to focus on the points $T_{12}$ and and $T_{21}$ on the observation plane after being reflected by the plane mirrors 12 and 13 two times. Then, this arrangement using parallel extended plane mirrors 12 and 13 causes the same effect as a conventional distance triangulation apparatus with its base line four times as long as "$d_1$" plus "$d_2$". In FIG. 4 imaginary lenses 14 and 15 could be supposed to appear as a consequence of one-time reflections, and imaginary lenses 19 and 20 could be supposed to appear as a consequence of two-time reflections. The images $T_1$ and $T_2$ are formed by the observation lens 5 after the rays of light from the given point T are reflected by the reflectors 12 and 13 once. The images $T_{12}$ and $T_{21}$ are formed on the observation plane 16 after the rays of light from the given point T are reflected by the reflectors 12 and 13 twice. The imaginary images $T_{1V}$, $T_{2V}$, $T_{12V}$ and $T_{21V}$ could be supposed to be formed by the imaginary lenses 14, 15, 19 and 20 respectively.

FIG. 5 shows still another embodiment using reflectors 23 and 24 arranged in the divergent form towards an observation lens 5. This arrangement causes the same effect as a triangulation distance measuring apparatus in which the angle $\theta_1 + \theta_2$ formed at the intersection of the optical axes 25 and 26 of two observation systems is equal to $2\phi_1 + 2\phi_2$ ("$\phi_1$" and "$\phi_2$" for the angle which the reflectors 23 and 24 form with respect to the optical axis of the observation lens 5).

Figure 6:
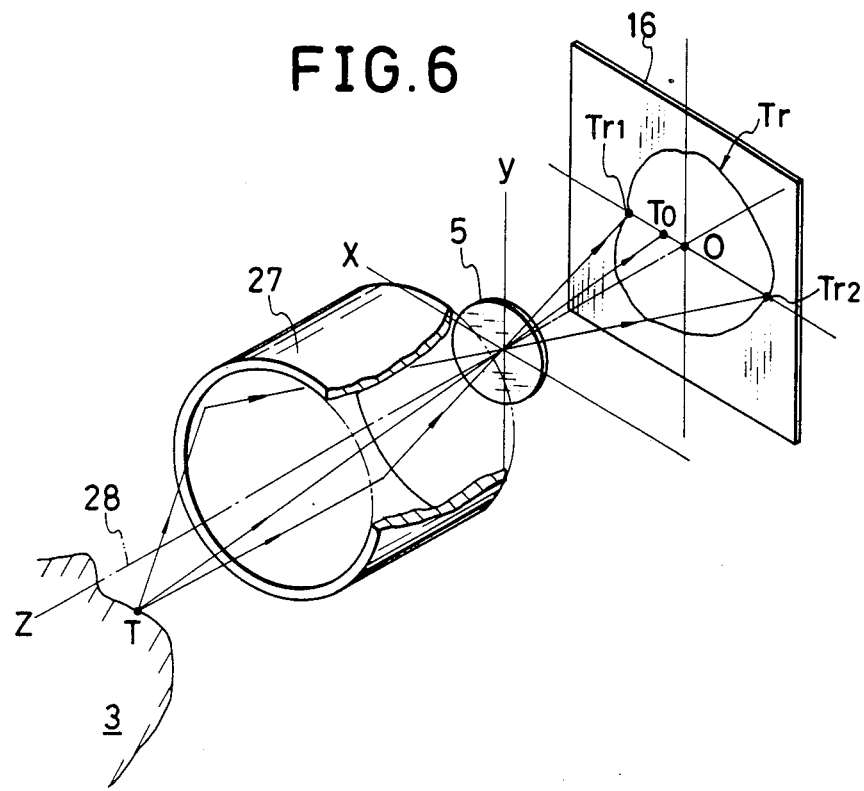
FIG. 6 shows diagrammatically another distance measuring apparatus using a cylindrical or cone-shaped reflector according to this invention.

FIG. 6 shows diagrammatically a distance measuring apparatus using a cylindrical or conical reflector 27. The rays of light from a given point T on an object 3 will focus on an observation plane 16 in a continuous closed line $T_r$. The ray of light from the given point T passes through the observation lens 5 to focus on the point $T_0$. Assuming a plane containing the given point T on the object 3 and the optical axis 28, the same arrangement as in FIGS. 2 and 3 will appear in the assumed plane, and a distance to the given point T can be accordingly. If the given point T on the object 3 is on the optical axis 28, the image of the given point formed on the observation plane 16 is in the form of circle with its center on the origin O in the observation plane, and the radius of the circle will vary with the distance from the origin to the given point T, thus permitting the determination of the distance to the given point from the radius of the circular image.

A particular point on an object to be measured can be a target attached to the object, or a bright spot or a pattern projected onto the object. A distance measuring apparatus according to this invention can be automized by arranging a single image detecting element on numerous ones in a distributed form on the whole area of the observation plane. Particularly in applying the principle of this invention to the optical probe method, image detecting sensors are arranged around the origin of the observation plane whereas a bright spot projecting unit is arranged on the optical axis of the observation lens. This arrangement is effective to assure an exact distance measurement, and at the same time, the substantial reduction of the whole size.

With the arrangement as, for instance, shown in FIG. 5 in which two reflectors and one observation lens are used, a three-dimensional image will be visible to the eyes when two two-dimensional images appearing on an observation plane ($T_1$ and $T_2$ in FIG. 5) are caught by the eyes. A three-dimensional observation should be possible if the principle of this invention is applied to the endoscopy.

Figure 7:
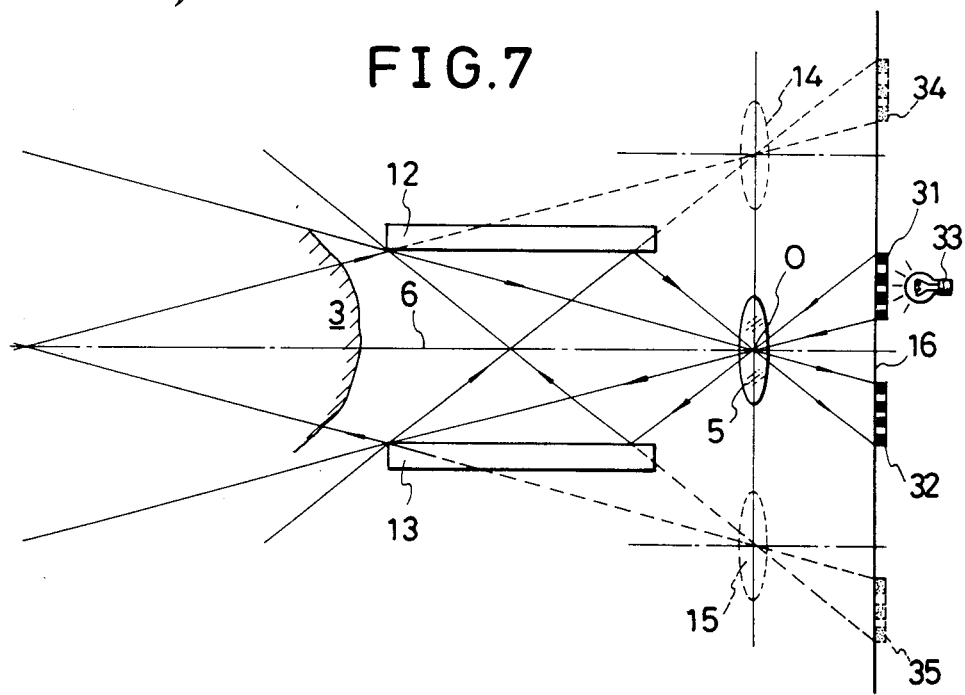
FIG. 7 shows diagrammatically a small-sized moire topography apparatus according to this invention.

FIG. 7 shows a small-sized moire topography apparatus using the principle of this invention. As shown, a grating 31 is illuminated by a light source 33 and its image is projected on an object 3 to be measured through an observation lens 5 after being reflected by the reflector 13.

The shadow of grating is deformed so as to be in conformity with the shape of the object. The so deformed grating shadow is reflected by the reflector 12 to pass through the lens 5 and fall on another grating 32 on the observation plane 16, thus forming a moire fringe pattern which shows a contour pattern of the object. This provides the same result as would be obtained by a moire topography apparatus having two observation lenses 14 and 15 apart a good distance from each other. Thus, it is apparent that the principle of this invention is effective to reduce substantially the size of a moire topography shape-determining apparatus.

If the arrangement of FIG. 7 is modified by putting a single grating on the origin of the observation plane in place of the lattices 31 and 32, and if two shadow grating images appearing on the observation plane are superposed on each other to produce a moire pattern, for instance, by processing data of the shadow grating images in computer or other electronic means, the so modified arrangement will be free of the adverse effect which would be caused by the illumination of a grating put at a place other than the origin of the observation plane.

The optical distance measuring apparatus according to the embodiment given in FIG. 6 may be modified by using a split cylindrical or conical mirror in place of the cylindrical mirror 27. The split cylindrical or conical mirror is composed of a plurality of curved strip surfaces extending parallel with the optical axis of the observation lens 5 so as to constitute a split cylinder or cone. Then, the image appearing on the observation plane 16 is in the form of split loop. Otherwise, a composite strip mirror comprising cylindrical, conical, and plane strips arranged around the optical axis of the observation lens may be used, and then different kinds of strips are used to form images of targets at different distances.

What is claimed is:

1. An optical distance measuring apparatus comprising: a reflector and an observation lens put at such a position that a ray of light from any particular point on an object may fall directly on the observation lens to produce a first image of said point in an observation plane and that a ray of light from the particular point may fall on the observation lens after being reflected by the reflector to produce on said observation plane a second image of the particular point spaced apart from said first image, thus permitting determination of a distance from the observation lens to the particular point on the object according to the triangulation.

2. An optical distance measuring apparatus according to claim 1 wherein said reflector is inclined towards said observation lens.

3. An optical distance measuring apparatus comprising reflector means and an observation lens put at such a position that a ray of light from any particular point on an object may fall on the observation lens after being reflected by the reflector means to produce first and second images of said point in an observation plane spaced apart from each other, thus permitting determination of a distance from the observation lens to the particular point on the object according to the triangulation.

4. An optical distance measuring apparatus as in claim 3 in which the reflector means is a cylindrical reflector.

5. An optical distance measuring apparatus as in claim 3 in which said reflector means is a conical reflector.

6. An optical distance measuring apparatus as in claim 3 in which said reflector means comprises two reflectors.

7. An optical distance measuring apparatus according to claim 4 or 5 wherein it further comprises a distribution of photo-detector elements in an imaging plane on which the image of the particular point appears in the form of closed or split loop.

8. An optical distance measuring apparatus according to claim 3 wherein said reflectors are plane mirrors extending parallel to the optical axis of said observation lens.

9. An optical distance measuring apparatus according to claim 8 wherein said plane mirrors extend a distance long enough to allow a ray of light from the particular point on the object to reflect two times before falling on said observation lens.

10. An optical distance measuring apparatus according to claim 3 said reflectors are plane mirrors extending convergent or divergent towards said observation lens.

11. An optical distance measuring apparatus comprising a plusality of strip reflectors and an observation lens put at such a position that a ray of light from any particular point on an object may fall on the observation lens after being reflected by the reflector to produce a plurality of images of said point in an observation plane spaced apart from each other, thus permitting determination of a distance from the observation lens to the particular point on the object according to the triangulation.

12. An optical distance measuring apparatus according to claim 11 wherein said strip reflectors constitute parts of a cylindrical mirror.

13. An optical distance measuring apparatus according to claim 11 wherein said strip reflectors constitute parts of a conical mirror.

14. An optical distance measuring apparatus according to claim 11 wherein said strip reflectors constitute parts of a cone-and-cylinder, cone-and-plane, or cylinder-and-plane mirror.

15. An optical distance measuring apparatus according to claim 11 wherein said strip reflectors constitute parts of a cone-cylinder-and-plane mirror.

16. A moire topography apparatus comprising: two reflections, an observation lens and at least one grating, said observation lens being put at such a position that rays of light from the image of the grating projected on an object may fall on the observation lens after being reflected by the reflectors to form a superposition of reference and deformed gratings.

* * * * *